United States Patent Office 3,507,785
Patented Apr. 21, 1970

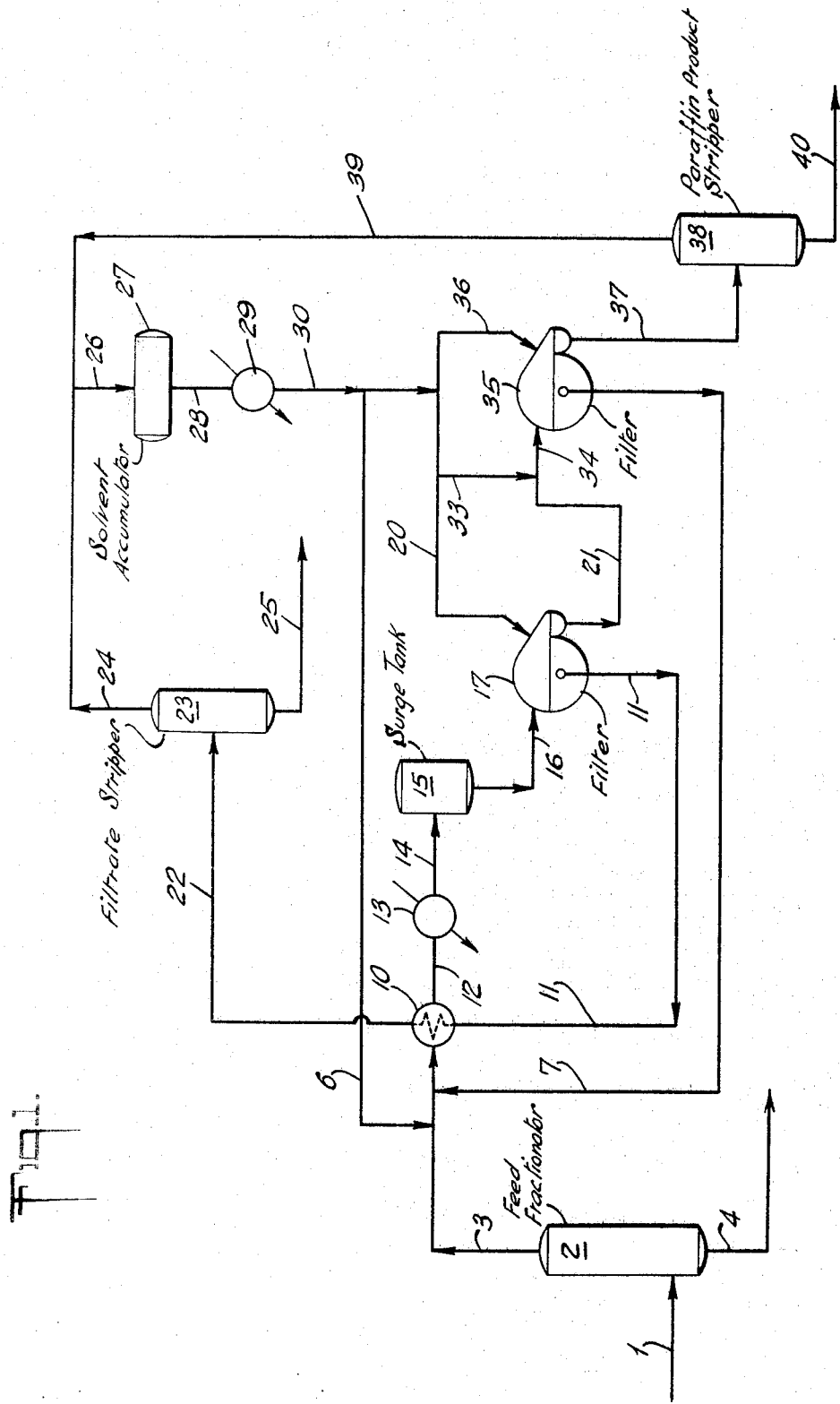

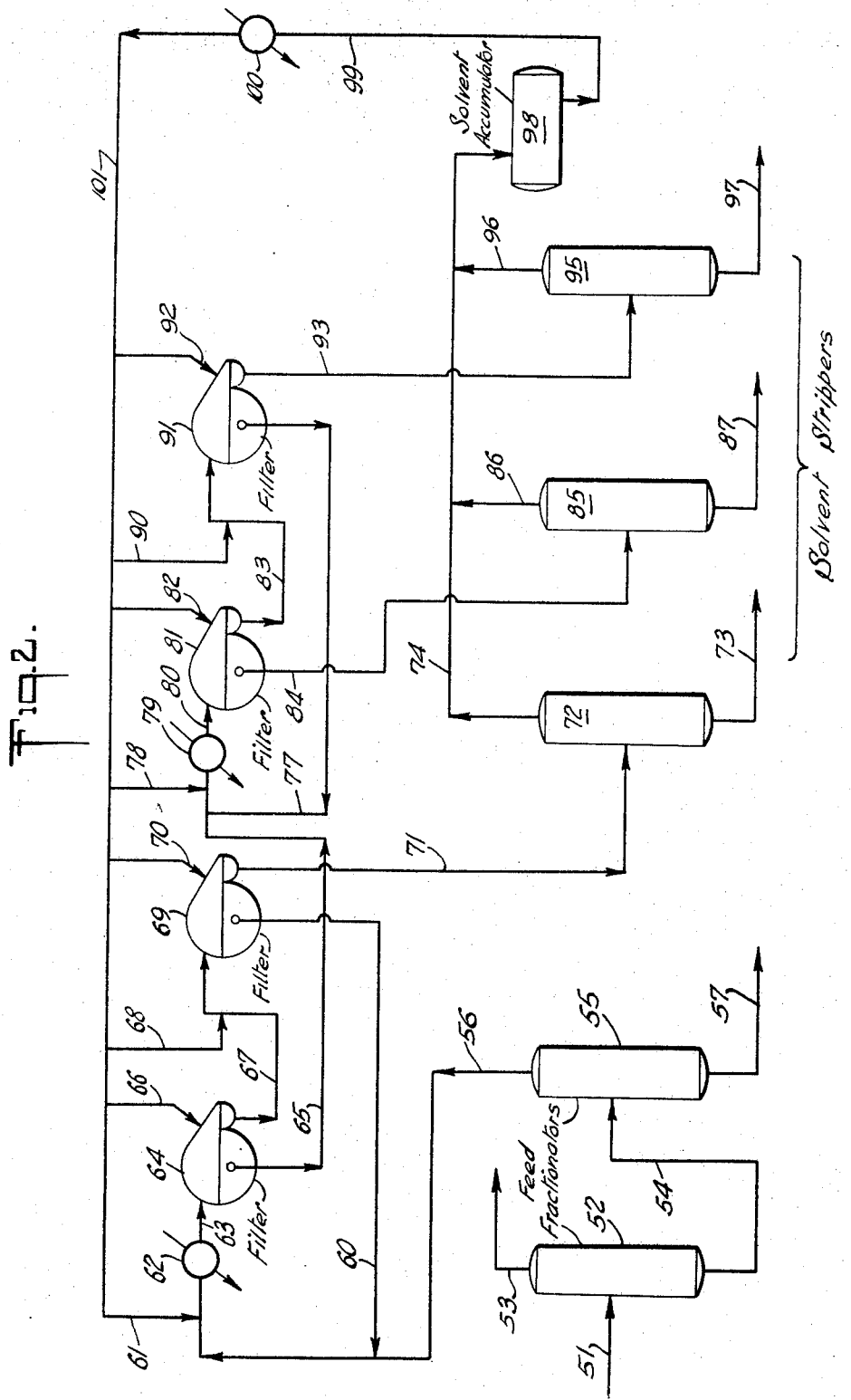

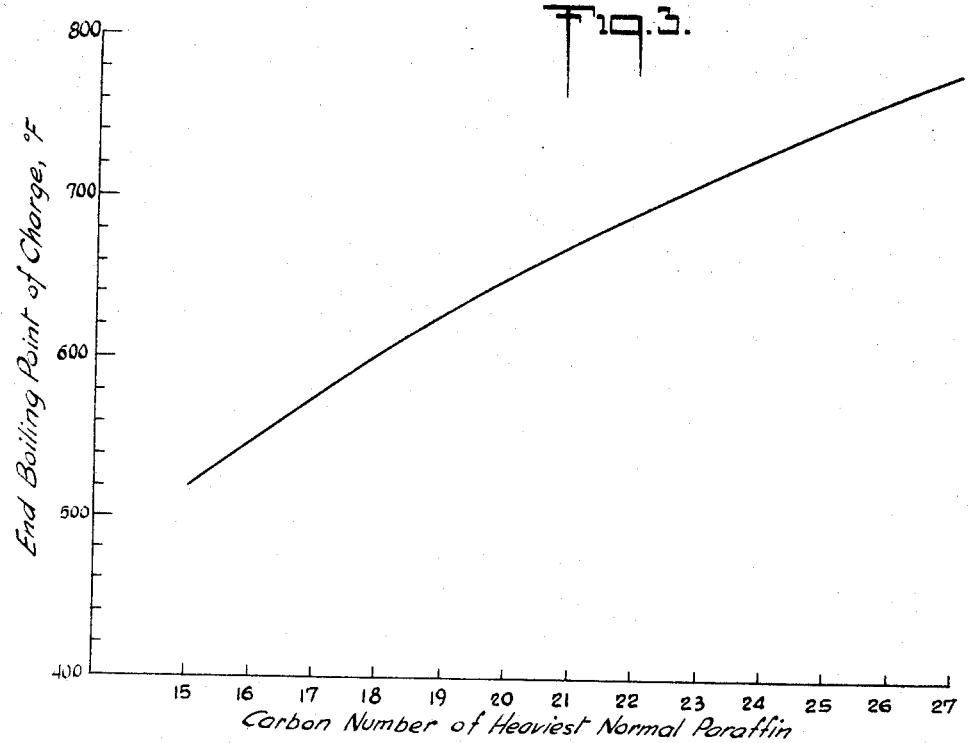
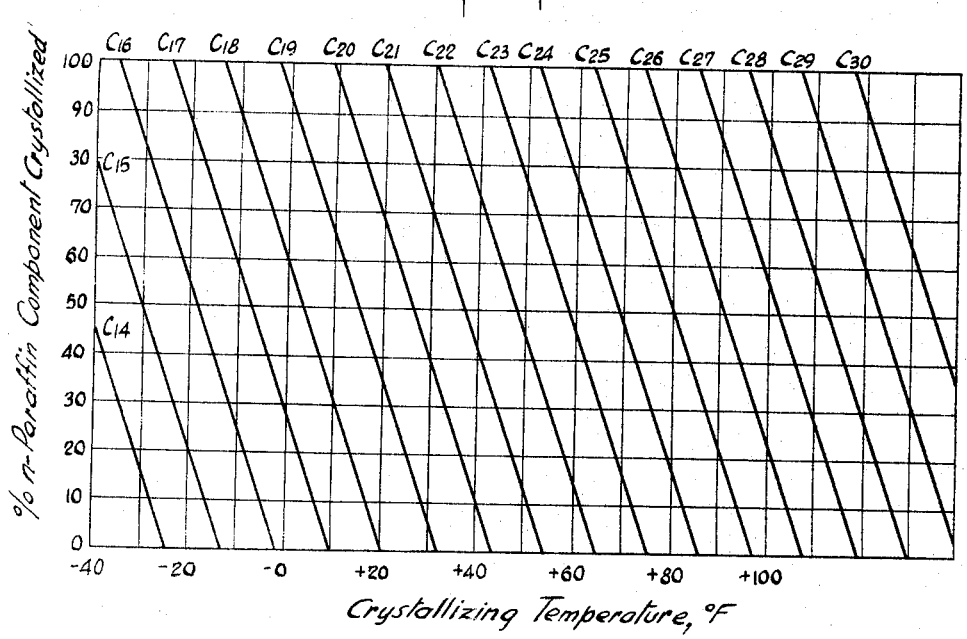

---

3,507,785
SEPARATION OF LONG CHAIN NORMAL PARAFFIN HYDROCARBONS
Thomas A. Cooper and Richard L. Coleman, Port Arthur, and Herbert C. Morris, Groves, Tex.; and John I. Nixon, deceased, late of Bridge City, Tex., by Roberta Lois Nixon, administratrix, Bridge City, Tex., assignors to Texaco Inc., New York, N.Y., a corporation of Delaware
Filed May 16, 1967, Ser. No. 639,000
Int. Cl. C07c 7/14; B01d 9/00
U.S. Cl. 208—308     8 Claims

---

ABSTRACT OF THE DISCLOSURE

Separation of long chain normal paraffin hydrocarbons from hydrocarbon mixtures containing said normal paraffin hydrocarbons by distillative separation of a fraction having an end point selected to include the highest carbon number constituent of the desired normal paraffin hydrocarbon product to the exclusion of the next higher carbon number normal paraffin hydrocarbon followed by solvent fractional crystallization involving dilution of said fraction with a solvent and chilling to a temperature effective to precipitate the lowest carbon number constituent of the desired normal paraffin hydrocarbon product to the exclusion of lower carbon number constituents.

---

BACKGROUND OF THE INVENTION

Field of the invention

This invention relates to a method of separating long chain normal paraffin hydrocarbons of selected chain length from hydrocarbon mixtures including other normal paraffin hydrocarbons, branched chain and cyclic hydrocarbons. This method involves the use of distillative separation in combination with cooling in the presence of a solvent to effect fractionation by partial solidification or crystallization. This invention is applicable to the separation of normal paraffins containing from 7 to 35 carbon atoms. It is particularly adapted to the separation of normal paraffin hydrocarbons containing 16 to 25 carbon atoms which are useful in the manufacture of biodegradable detergents, plasticizers and high purity chemical intermediates.

Description of the prior art

It has long been known that crude petroleum oils comprise mixtures of paraffin, naphthene, and aromatic hydrocarbons including normal paraffinic hydrocarbons of various chain lengths. However, the separation of pure normal paraffins having more than about 7 carbon atoms has been difficult since such materials appear in low concentration in complex mixtures of many hydrocarbon species having close boiling points. Schaerer, U.S. Patent 2,603,589, discloses a method of separating straight chain paraffin hydrocarbons having 20 to 60 carbon atoms from wax mixtures by the separation of fractions having a narrow boiling point range of not more than 40° C. (72° F.) followed by cooling to a temperature below that at which the straight chain paraffin hydrocarbons solidify. Recently British specification 1,029,464 has disclosed a method of separating pure normal paraffins having 12 to 16 carbon atoms by distillative separation of a very narrow fraction having a boiling range less than 8° C. (14.4° F.) and preferably less than 6° C. (10.8° F.) followed by crystallization at a temperature between −20° C. and a −30° C. (−4° F. and −22° F.) and preferably between −25° C. and −27° C. (−13 and −17° F.). It has now been found, in accordance with this invention that pure normal paraffin hydrocarbons may be separated from relatively wide boiling range feed stock with little or no regard for the initial boiling point of the mixture.

SUMMARY OF THE INVENTION

This invention relates to a method of separating a product comprising normal paraffin hydrocarbons from a hydrocarbon mixture containing other hydrocarbons including normal paraffins other than those having the chain length of the desired product. For example, a typical gas oil separated by distillation from crude oil is found to have the following tests and normal paraffin content:

ATMOSPHERIC GAS OIL

| | |
|---|---:|
| Gravity °API | 30.5 |
| Distillation, ASTM, ° F. | |
|   IBP | 512 |
|   5 | 552 |
|   10 | 565 |
|   20 | 585 |
|   30 | 603 |
|   40 | 619 |
|   50 | 638 |
|   60 | 658 |
|   70 | 679 |
|   80 | 704 |
|   90 | 733 |
|   95 | 744 |
| Pour point, ° F. | +50 |
| Analysis, normal paraffins, wt. percent | |
|   $n\text{-}C_{13}$ | 0.1 |
|   $n\text{-}C_{14}$ | 0.2 |
|   $n\text{-}C_{15}$ | 0.4 |
|   $n\text{-}C_{16}$ | 0.8 |
|   $n\text{-}C_{17}$ | 1.7 |
|   $n\text{-}C_{18}$ | 1.8 |
|   $n\text{-}C_{19}$ | 2.5 |
|   $n\text{-}C_{20}$ | 3.7 |
|   $n\text{-}C_{21}$ | 4.1 |
|   $n\text{-}C_{22}$ | 4.0 |
|   $n\text{-}C_{23}$ | 3.7 |
|   $n\text{-}C_{24}$ | 2.8 |
|   $n\text{-}C_{25}$ | 2.2 |
|   $n\text{-}C_{26}$ | 1.5 |
|   $n\text{-}C_{27}$ | 0.9 |
|   $n\text{-}C_{28}$ | 0.5 |
|   $n\text{-}C_{29}$ | 0.5 |
|   $n\text{-}C_{30}$ | 0.3 |
|   $n\text{-}C_{31}$ | 0.1 |
|   $n\text{-}C_{32}$ | 0.1 |
|   $n\text{-}C_{33}$ | 0.1 |
|   $n\text{-}C_{34}$ | 0.1 |
|   $n\text{-}C_{35}$ | 0.1 |
|   $n\text{-}C_{36}$ | — |
|   Total | 32.2 |

In accordance with this invention, the hydrocarbon mixture is distilled separating a distillate having a boiling range including the highest carbon number constituent of the desired normal paraffin product to the exclusion of the next higher carbon number constituent of said hydrocarbon mixture, that is, the distillation is run to produce distillate of controlled end point. The resulting hydrocarbon distillate is then subjected to solvent fractional crystallization. In the solvent fractional crystallization, the distillate is diluted with up to 5.0 volumes of a solvent at a temperature of complete miscibility of said solvent and distillate. The diluted distillate is then cooled to a temperature within the range of −60 to +50° F. and specifically to the temperature at which the lowest carbon number constituent of the desired normal paraffins separates as a solid from a solution comprising solvent, other hydrocarbons, and normal paraffin hydrocarbons of the next lower carbon number. In one embodiment of this invention, a hydrocarbon mixture is distilled to an end boiling point of 650° F., the distillate is diluted with 0.5 to 2.0 volumes of methylethyl ketone and the diluted mixture cooled to a separation temperature within the range of −20 to +20° F. separating a normal paraffin product containing normal paraffins having from 15 to 20 carbon atoms of greater than 95 percent purity.

In the fractional crystallization of paraffinic hydrocarbons from solvent diluted mixtures, the solvent dilutes the supernatant liquid and reduces its viscosity so that more complete and rapid separation of the supernatant liquid may be effected. Crystallization in the presence of a solvent also fosters crystal growth in well formed easily filtered condition. The solvent fractional crystallization of pure normal paraffins may employ the solvents, apparatus and methods employed in the well known solvent dewaxing process which is widely used to lower the cloud and pour points of lubricating oil fractions. Accordingly, solvents for use in the process of this invention include ketones for example, acetone, methylethyl ketone, methyl n-propyl ketone, methylisopropyl ketone, methylisobutyl ketone and their mixtures. Advantageously the ketone solvent may be modified by the addition of an aromatic hydrocarbon, for example, benzene or toluene as in solvent dewaxing. Cooling is advantageously effected in scraped wall exchangers to maintain high heat transfer rates and prevent plugging. Separation of the normal paraffin crystals from supernatant liquid is desirably effected with drum type vacuum filters.

Purity of the separated normal paraffins may be increased by a repulping operation wherein the separated normal paraffins are combined with 1.0 to 8.0 volumes of additional solvent and the normal paraffins then separated from the repulping solvent at a temperature within the range of −60 to +50° F. When employing such a repulping operation, the separated repulping solvent is advantageously recycled with the distillate feed to provide at least a part of the solvent used for dilution in the first separation step. Preferably, in the separation of $C_{15}$ to $C_{20}$ normal paraffins, the separated normal paraffins are repulped with 2.0 to 6.0 volumes of solvent per volume of normal paraffins and said normal paraffins are then separated from said repulping solvent at a temperature within the range of −25 to +20° F.

Since the selection of the separation conditions determines the lowest carbon number separated as a solid in the normal paraffin product, normal paraffins of lower carbon number remaining in solution with the other hydrocarbons and solvent may be separated in a subsequent separation step employing a lower temperature. For example, normal paraffins of lower carbon numbers may be separated by cooling the liquid from the first separation to a temperature at least 10° F. below the temperature of the first separation. The purity of the separated normal paraffins of lower carbon numbers may also be increased by repulping with 1.0 to 8.0 volumes of solvent, and separating the repulped normal paraffins from the repulping solvent at a temperaut̃re within the range of −60 to +50° F. Normal paraffin products comprising normal paraffins of 99 plus weight percent purity may be separated in accordance with this invention.

BRIEF DESCRIPTION OF THE DRAWINGS

FIGURE 1 is a flow diagram illustrating the separation of normal paraffins with one stage of separation and one step of purification by repulping.

FIGURE 2 is a flow diagram illustrating the separation of two normal paraffin products each product being subjected to a repulping purification.

FIGURE 3 is a representation of the relationship of the end boiling point of a hydrocarbon oil charge with the carbon number of the heaviest normal paraffin in the fraction.

FIGURE 4 is a representation of the relationship of the amount of normal paraffin of a particular carbon number crystallized with the crystallization temperature.

Although the flow diagrams illustrate particular arrangements of apparatus and materials which may be used in the practice of this invention, it is not intended to limit the invention to the particular apparatus or materials described.

Referring to FIGURE 1, a 430° F. IBP gas oil is passed as charge stock through line 1 to distillation tower 2. Distillation tower 2 is operated to separate distillate through line 3 which distillate has an end point selected to include the highest carbon number normal paraffin in the desired normal paraffin product. For example, the separation of a distillate having an end point of 650° F. effects inclusion of normal paraffins having carbon numbers up to 20 in the distillate. Higher carbon number normal paraffins and other hydrocarbons boiling above 650° F. are withdrawn as bottoms product through line 4 for use as fuel or cracking stock not shown. The distillate is diluted with solvent, for example, methylethyl ketone from line 6 and recycle filtrate from line 7 and passed to heat exchanger 10. In heat exchanger 10, the oil-solvent mixture is cooled by indirect heat exchange with effluent filtrate stream in line 11. The cooled mixture from exchanger 10 is passed through line 12 to chiller 13 wherein the temperature is further reduced to cause precipitation of normal paraffin crystals. Exchanger 10 and chiller 13 are advantageously scraped wall double pipe exchangers such as those used in the dewaxing of lubricating oil fractions. The chilled slurry of normal paraffin crystals in solvent diluted oil is passed through line 14 to filter feed tank 15 which serves as a surge tank and also provides time for crystal development. The slurry from tank 15 is withdrawn through line 16 and passed to vacuum rotary drum filter 17. Separated normal paraffin crystals are washed with solvent introduced through line 20 and discharged through line 21. Filtrate and washings from filter 17 are withdrawn through line 11 and passed to heat exchanger 10 to provide a portion of the cooling load as described hereinbefore. Effluent filtrate from exchanger 10 is passed through line 22 to solvent stripper 23 wherein solvent is separated as distillate in line 24 and stripped filtrate is withdrawn through line 25. The filtrate comprises a deparaffinized 650° F. end point gas oil having a lower pour point than the feed and accordingly is useful in the manufacture of low pour point fuel oils.

The distillate in line 24 comprising solvent is passed through line 26 to solvent accumulator drum 27 wherein it is collected for reuse. Solvent is withdrawn from drum 27 through lines 28 cooled in chiller 29 and discharged through line 30 to supply the solvent required in lines 6, 20, 33 and 36. Normal paraffin crystals are passed through line 21 and combined with additional solvent from line 33 and passed through line 34 to repulping filter 35. The normal paraffin crystals are separated and washed with additional solvent introduced through line 36. Washed crystals of normal paraffin are withdrawn through line 37 and passed to solvent stripper 38. In solvent stripper 38, solvent is separated as distillate in line 39 and combined with the solvent in line 26 for return to solvent accumulator drum 27. Stripped normal paraffin product is withdrawn through line 40. Wash solvent streams 20 and 36 are employed to separate occluded oil from the normal paraffin crystals. The deparaffinized filtrate stream in line 7 is employed as a portion of the dilution solvent combined with the distillate in line 3. The intermediate purity normal paraffin stream in line 21 is diluted with solvent from line 33 and charged to rotary filter 35 where additional non-normal paraffin impurities are removed in the filtrate stream. This filtrate removed through line 7 is employed as described heretofore to provide a portion of the dilution solvent.

Referring to FIGURE 2, a wide boiling range gas oil is charged through line 51 to feed fractionator 52. In fractionator 52, low boiling constituents are removed as distillate through line 53. Distillation to remove front end fractions which do not contain desired normal paraffins is employed to reduce the amount of material handled in subsequent processing steps but need not be precise since the subsequent crystallization of normal paraffis is controlled to effect separation between the desired normal paraffin product and normal paraffins of lower carbon numbers. Distillation bottoms from fractionator 52 which may include, for example, normal paraffins having from 12 to 30 carbon atoms, are withdrawn through line 54 and passed to distillation tower 55. Distillation tower 55 is operated to separate a controlled end boiling point distillate such that the distillate includes the highest carbon number normal paraffin desired in the product, for example, $C_{20}$ normal paraffin. Higher boiling range hydrocarbons and normal paraffins of higher carbon number than desired in the normal paraffin product are withdrawn as bottoms through line 57. The distillate fraction in line 56 is combined with filtrate from line 60 and solvent from line 61 and passed through chiller 62 wherein the temperature is reduced to crystallize the desired normal paraffin product, for example, normal paraffins in the $C_{17}$ to $C_{20}$ range. The slurry of crystals in supernatant liquid is passed through line 63 to filter 64 wherein the crystals are separated from the filtrate stream withdrawn through line 65. The normal paraffin crystals are washed with additional solvent introduced through line 66 and withdrawn through line 67. The normal paraffin crystals are then repulped with additional solvent from line 68 and the mixture passed to filter 69 where the repulped purified crystals are separated, washed with additional solvent from line 70, and discharged through line 71. Filtrate comprising washing solvent and a small amount of occluded oil is withdrawn through line 60 and recycled as described above. Normal paraffin product in line 71 is stripped of solvent in solvent stripping tower 72. Product normal paraffins, for example, $C_{17}$ to $C_{20}$ normal paraffins are withdrawn through line 73 and solvent is recovered as distillate through line 74.

Filtrate in line 65 which comprises normal paraffins having carbon numbers less than those separated in filter 64 for example $C_{12}$ to $C_{17}$ normal paraffins and other hydrocarbons and solvent in line 65 is combined with filtrate in line 77 and solvent from line 78 and passed to chiller 79. In chiller 79, the temperature is reduced to a lower level crystallizing the $C_{15}$ to $C_{17}$ normal paraffins in the mixture and the resulting slurry of crystals in oil is passed through line 80 to filter 81. In filter 81 the separated normal paraffin crystals are washed with additional solvent from line 82 and withdrawn through line 83. Filtrate is withdrawn through line 84 and passed to solvent stripper 85 wherein solvent is removed as distillate through line 86 and deparaffinized oil is withdrawn as bottoms through line 87. The separated normal paraffin crystals in line 83 are repulped with additional solvent introduced through line 90 and passed to filter 91. The repulped crystals are separated in filter 91, washed with additional solvent introduced through line 92, and withdrawn through line 93. The resulting filtrate comprising the removed occluded oil and solvent is recycled through line 77 as described hereinbefore. The washed repulped normal paraffin crystals are passed to solvent stripper 95 wherein solvent is removed as distillate through line 96 and purified $C_{15}$ to $C_{17}$ normal paraffins are withdrawn through line 97. Solvent from lines 74, 86, and 96 is accumulated in solvent accumulator 98 to supply solvent through line 99 solvent chiller 100 and line 101 to lines 61, 66, 68, 70, 78, 82, 90 and 92.

FIGURE 3 shows the relationship of the end boiling point of a hydrocarbon fraction with the carbon number of the heaviest normal paraffin contained therein. In a fractional crystallization process, the highest carbon number normal paraffin present in the feed crystallizes first and successively lower carbon number constituents separate as the temperature is reduced. Accordingly, in the process of this invention the feed stock is first distilled to separate a distillate having a distillation end boiling point selected to exclude those normal paraffins having higher carbon numbers than desired. By way of example, if it is intended to produce a normal paraffin product containing normal paraffins having 17 and less carbon atoms, FIGURE 3 indicates that the fractional crystallization charge should be distilled to an end point of about 580 to 590° F. When seeking a normal paraffin product containing 20 carbon atoms and less the end point of the distillate is maintained at 650 to 660° F.

As the crystallization temperature is reduced, additional amounts of a given carbon number constituent crystallize out and then lower carbon number constituents begin to crystallize out. This relationship for crystallization of normal paraffins from a hydrocarbon mixture diluted with methylethyl ketone is shown in FIGURE 4. It will be observed that with normal paraffin hydrocarbons containing 20 carbon atoms crystallization begins at about 42° F. and as the temperature is reduced additional $C_{20}$ normal paraffins crystallize until at a temperature of about 8° F. all $C_{20}$ normal paraffins have crystallized. Crystallization of 19 carbon atoms normal paraffins begins at about 32° and all $C_{19}$ normal paraffins are crystallized by the time the temperature reaches −2° F. Accordingly recovery of the highest molecular weight normal paraffin in the product is regulated by the end boiling point of the charge to the fractional crystallization and the lowest molecular weight normal paraffin in the product is controlled by fractional crystallization temperature. FIGURE 4 may be used to estimate the recovery of each normal paraffin component of a charge stock for a given fractional crystallization temperature and from an analysis of the charge, the expected yield of normal paraffin product can be determined. For example, separation at 0° F. is indicated to recover all of the $C_{20}$ and higher normal paraffins in the charge, 93% of the $C_{19}$ normal paraffins, 59% of the $C_{18}$ normal paraffins, 26% of the $C_{17}$ normal paraffins and essentially none of the $C_{16}$ and lower normal paraffins. Separation temperatures below −40° F. are indicated to be required to recover about half of the $C_{14}$ normal paraffins which temperature is about the economic limit for solvent fractional crystallization at this time. The upper limit of normal paraffin recovery is about the $C_{30}$ normal paraffins since the transition to microcrystalline waxes occurs at about this level.

DESCRIPTION OF THE PREFERRED EMBODIMENTS

Example I

In an example of the process of this invention, a gas oil fraction having an end boiling point of 637° F. is separated by distillation and charged to a solvent fractional crystallization system employing methylethyl ketone (MEK) as solvent at the conditions and with the results shown in Table I following:

TABLE I

| Charge tests | |
|---|---|
| Boiling range, ° F. | Gas oil |
| Initial boiling point | 540 |
| End point | 637 |
| Analysis, n-paraffins, wt. percent | |
| n-$C_{15}$ | 0.1 |
| n-$C_{16}$ | 1.3 |
| n-$C_{17}$ | 2.5 |
| n-$C_{18}$ | 2.8 |
| n-$C_{19}$ | 3.6 |
| n-$C_{20}$ | 1.6 |
| Total | 11.9 |

Operating conditions
  Primary fractional crystallization
    Solvent _____ MEK
    Dilution, vol. solvent:vol. charge _____ 1:1
    Wash, vol. solvent:vol. charge _____ 1:1
    Filtering temperature, ° F _____ −10
  Repulping
    Solvent _____ MEK
    Dilution, vol. solvent:vol. charge _____ 4:1
    Wash, vol. solvent:vol. charge _____ 3:1
    Filtering temperature, ° F _____ −10
Normal paraffin product
  Yield vol. percent charge _____ 9.5
  Analysis, n-paraffins, wt. percent
    n-$C_{15}$ _____ 0
    n-$C_{16}$ _____ 0.9
    n-$C_{17}$ _____ 14.1
    n-$C_{18}$ _____ 26.8
    n-$C_{19}$ _____ 36.5
    n-$C_{20}$ _____ 19.4

Total _____ 97.7

Analysis of the results in Table I shows that although the gas oil charge stock contains over 88% non-normal paraffin hydrocarbons, the separated product contains 97.7 wt. percent normal paraffins and 96.8 percent $C_{17}$–$C_{20}$ normal paraffins. It will further be noted that although the feed stock contains substantial amounts of $C_{15}$ and $C_{16}$ normal paraffins, the separated product is free of $C_{15}$ normal paraffins and contains only about 6 percent of the $C_{16}$ normal paraffins contained in the feed.

Example II

In this example a gas oil is distilled to a 623° F. end point to include $C_{19}$ normal paraffins but to exclude higher boiling normal paraffins. The resulting distillate is then subjected to solvent fractional crystallization at the conditions and with results shown in the following Table II.

TABLE II

| Charge Tests | Gas Oil |
|---|---|
| Boiling Range, ° F.: | |
| Initial Boiling Point | 540 |
| End Point | 623 |
| Analysis, n-paraffins, wt. percent: | |
| n-$C_{15}$ | 0.2 |
| n-$C_{16}$ | 1.4 |
| n-$C_{17}$ | 5.7 |
| n-$C_{18}$ | 4.6 |
| n-$C_{19}$ | 3.6 |
| n-$C_{20}$ | 0 |
| Total | 15.5 |

| Operating Conditions | Test A | Test B |
|---|---|---|
| Primary fractional crystalliztion: | | |
| Solvent | MEK | MEK |
| Dilution, vol. solvent:vol. charge | 1:1 | 1:1 |
| Wash, vol. solvent:vol. charge | 2:1 | 2:1 |
| Filtering temperature, ° F | 0 | +10 |
| Repulping: | | |
| Solvent | MEK | MEK |
| Dilution, vol. solvent:vol. charge | 6:1 | 6:1 |
| Wash, vol. solvent:vol. charge | 3:1 | 3:1 |
| Filtering temperature, ° F | 0 | +10 |
| Normal Paraffin Product, Yield Vol. Percent Charge | 7.4 | 4.5 |
| Analysis, n-paraffin wt. percent: | | |
| n-$C_{15}$ | 0 | 0 |
| n-$C_{16}$ | 1.7 | 0 |
| n-$C_{17}$ | 18.8 | 3.4 |
| n-$C_{18}$ | 38.4 | 28.4 |
| n-$C_{19}$ | 38.9 | 61.9 |
| n-$C_{20}$ | 1.2 | 3.0 |
| n-$C_{21}$ | 0 | 0.8 |
| Total | 99.0 | 97.5 |

Table II shows that fractional crystallization at 0° F. produces a product comprising 99.0 wt. percent normal paraffins or 96.1 percent $C_{17}$–$C_{19}$ normal paraffins. Fractional crystallization at +10° F. at the same dilution and wash solvent ratios gives a normal paraffin product of 97.5 wt. percent normal paraffins comprising 90.3 wt. percent $C_{18}$ and $C_{19}$ normal paraffins.

Example III

The ability of the present invention to employ a feed stock with a considerable amount of light material therein is shown in the treatment of a light gas oil distilled to have a boiling range of 447 to 616° F. This feed stock is subjected to fractional crystallization in the presence of methylethyl ketone solvent at the conditions with the results shown in the following Table III:

TABLE III

Charge tests
  Boiling range, ° F.                                    Gas oil
    Initial boiling point _____ 447
    End point _____ 616
  Analysis, n-paraffins, wt. percent
    n-$C_{11}$ _____ 0.1
    n-$C_{12}$ _____ 0.2
    n-$C_{13}$ _____ 0.9
    n-$C_{14}$ _____ 1.5
    n-$C_{15}$ _____ 1.6
    n-$C_{16}$ _____ 1.8
    n-$C_{17}$ _____ 1.6
    n-$C_{18}$ _____ 2.1
    n-$C_{19}$ _____ 2.5
    n-$C_{20}$ _____ 0.7

Total _____ 13.0

Operating conditions
  Primary fractional crystallization
    Solvent _____ MEK
    Dilution, vol. solvent: vol. charge _____ 0.5:1
    Wash, vol. solvent: vol. charge _____ 1:1
    Filtering temperature, ° F. _____ −10
  Repulping
    Solvent _____ MEK
    Dilution, vol. solvent: vol. charge _____ 4:1
    Wash, vol. solvent: vol. charge _____ 3:1
    Filtering temperature, ° F. _____ −10
Normal paraffin product
  Yield vol. percent charge _____ 10.7
  Analysis, n-paraffins wt. percent
    n-$C_{11}$ _____ 0
    n-$C_{12}$ _____ 0
    n-$C_{13}$ _____ 0
    n-$C_{14}$ _____ 0
    n-$C_{15}$ _____ 0.4
    n-$C_{16}$ _____ 2.3
    n-$C_{17}$ _____ 14.2
    n-$C_{18}$ _____ 26.4
    n-$C_{19}$ _____ 34.5
    n-$C_{20}$ _____ 19.9

Total _____ 97.7

Reference to Table III shows that although the feed stock contains substantial amounts of $C_{11}$–$C_{14}$ normal paraffins, none of these normal paraffins appear in the normal paraffin product, and the normal paraffin product comprise 95.0% $C_{17}$ to $C_{20}$ normal paraffins.

We claim:
1. A method of separating normal paraffin having from 15 to 20 carbon atoms from a gas oil containing such paraffins and other hydrocarbons which comprises:
  (1) distilling said gas oil, and separating a distillate comprising normal paraffins having from 15 to 20 carbon atoms and having a boiling range from substantially the initial boiling point of said gas oil and including the highest carbon number constituent of the desired normal paraffin product to the substantial exclusion of the next higher carbon number normal paraffin constituent of said gas oil,
  (2) diluting said distillate with up to 5.0 volumes of a solvent at a temperature of complete miscibility of said solvent and said distillate forming a diluted distillate,

(3) cooling said diluted distillate to a temperature within the range of −60 to +50° F. and at which the lowest carbon number constituent normal paraffin of the desired normal paraffin product separates as a solid comprising said product from a solution comprising solvent, other hydrocarbons, and normal paraffins of lower carbon numbers.

(4) and separating said solid comprising said normal paraffin product from said solution in a yield of at least 95 weight percent.

2. The process of claim 1 wherein said distillate has an end boiling point of 650° F., said distillate is diluted with 0.5 to 2.0 volumes of said solvent, and said diluted distillate is cooled to a separation temperature within the range of −20 to +20° F.

3. The process of claim 1 wherein said solvent comprises a ketone selected from the group consisting of acetone, methylethyl ketone, methyl n-propyl ketone, methyl-isopropyl ketone, methyl-isobutyl ketone and their mixtures.

4. The process of claim 3 wherein said solvent comprises said ketone and an aromatic hydrocarbon selected from the group consisting of benzene and toluene.

5. The process of claim 1 wherein the separated normal paraffins are repulped with 1.0 to 8.0 volumes of solvent, said normal paraffins are separated from the repulping solvent at a temperature within the range of −60 to +50° F., and separated repulping solvent is recycled to provide at least a portion of said solvent used for dilution of said distillate.

6. The process of claim 5 wherein said separated normal paraffins are repulped with 2.0 to 6.0 volumes of solvent and said normal paraffins are separated from said repulping solvent at a temperature within the range of −25 to +20° F.

7. The process of claim 1 wherein said solution comprising solvent, other hydrocarbons and normal paraffins of the next lower carbon number is cooled to a temperature at least 10° F. below the temperature to which said diluted distillates is cooled effecting separation of said normal paraffins of lower carbon number as a solid from remaining solution comprising solvent and other hydrocarbons.

8. The process of claim 7 wherein the separated normal paraffins of lower carbon numbers are repulped with 1.0 to 8.0 volumes of solvent, said normal paraffins of lower carbon numbers are separated from the repulped solvent at a temperature within the range of −60 to +50 F., and separated repulping solvent is recycled in admixture with said solution.

References Cited

UNITED STATES PATENTS

| | | | |
|---|---|---|---|
| 3,409,514 | 11/1968 | Drapeau et al. | 260—676 |
| 1,951,780 | 3/1934 | Voorhees | 62—58 |
| 2,603,589 | 7/1952 | Schaerer | 208—24 |
| 2,815,364 | 12/1957 | Green | 260—676 |
| 3,067,270 | 12/1962 | Weedman | 203—48 |

FOREIGN PATENTS 525,388    8/1940    Great Britain.

HERBERT LEVINE, Primary Examiner

U.S. Cl. X.R.

203—48; 260—676